Oct. 15, 1929.  W. O. SMITH  1,731,874

AX

Filed April 23, 1928

W. O. Smith
Inventor

By C. A. Snow & Co.
Attorneys

Patented Oct. 15, 1929

1,731,874

UNITED STATES PATENT OFFICE

WILLIAM O. SMITH, OF BUCKHANNON, WEST VIRGINIA

AX

Application filed April 23, 1928. Serial No. 272,277.

This invention relates to axes, and more particularly to the construction of the heads thereof, the primary object of the invention being to provide an ax head having a cutting blade at one end thereof for cutting logs, while the opposite end of the head is formed into a blade especially designed for cutting brush, or bushes wherein the branches lie close to the ground surface.

An important object of the invention is to provide a brush cutting blade having means whereby the blade will be restricted from passing into the ground surface during the cutting operation, thereby eliminating any possibility of dulling the blade by the contact of the blade with the ground surface.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figures 1, 2:
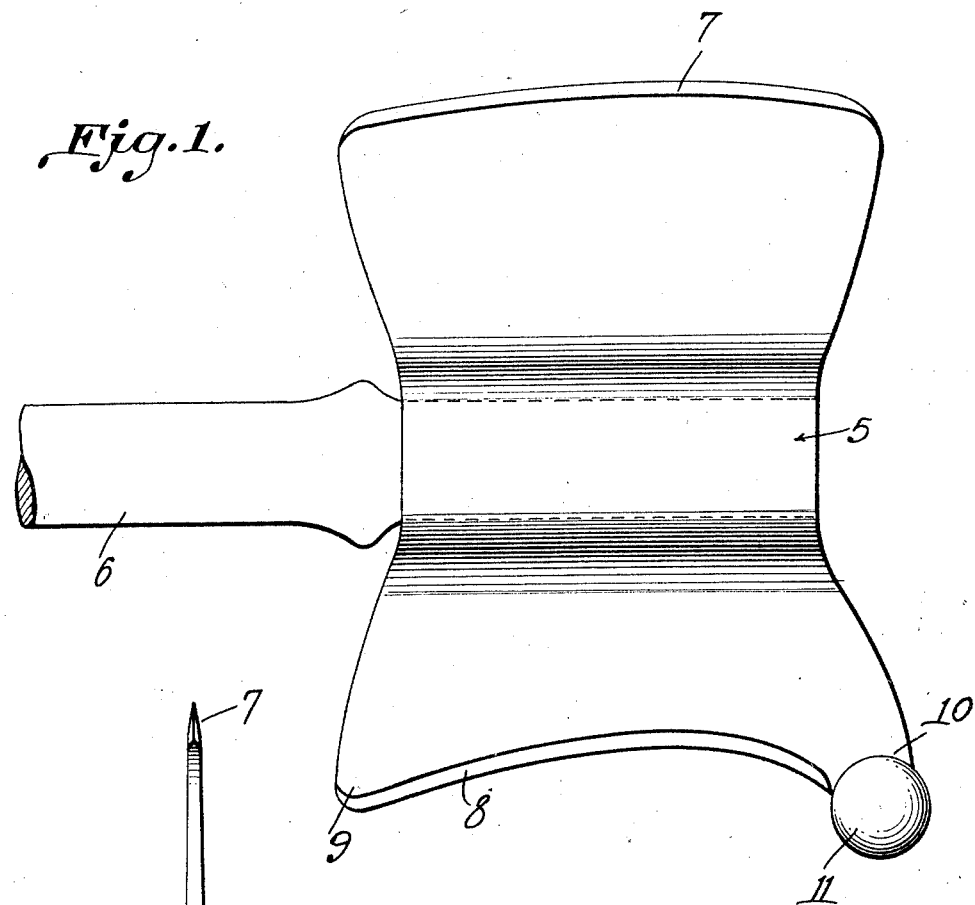
Figure 1 is a side elevational view of an ax showing a head constructed in accordance with the invention.
Figure 2 is a front elevational view thereof.

Referring to the drawing in detail, the head of the ax is indicated generally by the reference character 5, and is provided with the usual handle opening in which the handle 6 extends.

One edge of the head is formed into a cutting blade 7 especially designed for use in cutting trees or logs, while the opposite edge of the head is formed into a blade 8 designed for cutting brush or shrubbery wherein the branches lie close to the ground surface.

The blade 8 is slightly curved as clearly shown by Figure 1 of the drawing and defines corners 9 and 10 respectively, the corner 10 however which is the outer corner of the blade, being supplied with an enlargement 11, which is in the form of a ball so that when the blade is used in cutting brush or shrubbery, the ball will contact with the ground and prevent the stroke from forcing the blade into the ground surface to dull the blade.

While I have shown and described an enlargement in the form of a ball, it is to be understood that the shape and size of the enlargement may be changed without departing from the spirit of the invention.

I claim:

An ax head including a blade, the cutting edge of the blade being curved from end to end, a ball at the forward end of the blade, said ball being substantially large and extended appreciable distances beyond the sides of the blade to prevent the blade from being driven into the ground surface, and said head having a handle opening.

In testimony that I claim the foregoing as my own, I have hereto affixed my signature.

WILLIAM O. SMITH.